US006178037B1

United States Patent
Sugaya et al.

(10) Patent No.: US 6,178,037 B1
(45) Date of Patent: *Jan. 23, 2001

(54) OPTICAL AMPLIFYING APPARATUS

(75) Inventors: Yasushi Sugaya; Susumu Kinoshita; Hiroshi Onaka; Terumi Chikama, all of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/028,825

(22) Filed: Feb. 24, 1998

Related U.S. Application Data

(62) Division of application No. 08/601,244, filed on Feb. 14, 1996, now Pat. No. 5,737,118.

(30) Foreign Application Priority Data

May 8, 1995 (JP) .................................................... 7-109694

(51) Int. Cl.$^7$ ........................................................ H01S 3/00
(52) U.S. Cl. .............................................................. 359/341
(58) Field of Search ....................................... 354/179, 177, 354/160, 341

(56) References Cited

U.S. PATENT DOCUMENTS

| 5,299,048 | | 3/1994 | Suyama . | |
|---|---|---|---|---|
| 5,374,973 | * | 12/1994 | Maxham et al. | 359/341 |
| 5,479,424 | * | 12/1995 | Sakuyama | 372/26 |
| 5,485,299 | | 1/1996 | Jones . | |
| 5,513,029 | * | 4/1996 | Roberts | 359/177 |
| 5,528,404 | * | 6/1996 | MacKichan | 359/110 |
| 5,572,352 | | 11/1996 | Carbone, Jr. et al. . | |
| 5,625,481 | | 4/1997 | Tamura et al. . | |
| 5,633,749 | * | 5/1997 | Shibuya | 359/341 |
| 5,701,195 | * | 12/1997 | Chikama | 359/341 |
| 5,703,711 | * | 12/1997 | Hamada | 359/341 |
| 5,737,118 | * | 4/1998 | Sugaya et al. | 359/341 |

FOREIGN PATENT DOCUMENTS 5-235458  9/1998 (JP) .

* cited by examiner

*Primary Examiner*—Mark Hellner
(74) *Attorney, Agent, or Firm*—Helfgott & Karas, P.C.

(57) ABSTRACT

A computer-controlled optical amplifying apparatus, which includes an optical amplifying unit including an optical amplifying medium and an optical amplifying control unit controlling the optical amplifying unit under the control of a computer. This optical amplifying control unit is constituted by a status monitoring unit for monitoring the status, an optical output control unit for controlling the optical amplifying unit in accordance with the result of monitoring of status; and a status restoring unit for initializing the control status of the optical output control unit by initializing the computer when detecting an occurrence of the abnormal status by the result of monitoring of status and restoring the optical output control unit to the control status before occurrence of the related abnormal status within a relaxation time inherent in the optical amplifying medium occurring accompanied with this initialization.

8 Claims, 9 Drawing Sheets

OPTICAL AMPLIFYING APPARATUS

This application is a divisional application of Ser. No. 08/601,244, filed Feb. 14, 1996, now allowed now U.S. Pat. No. 5,737,118.

BACKGROUND OF THE INVENTION

1. Field of the Invention

The present invention relates to an optical amplifying apparatus, more particularly relates to an optical amplifying apparatus in which the amplification operation is controlled by a computer.

In recent years, there have been remarkable advances made in the technology of optical amplification in research and development of optical communication systems. For example, there has been much more active development of optical cascaded amplifying and repeating transmission systems.

The core of that optical amplification technology is the optical amplifying apparatus. This is utilized as a repeater (in-line amplifier) at a main line side of an optical communication network or as a pre-positioned amplifier (pre-amplifier) or a power amplifier (post-amplifier). At the subscriber side of that optical communication network, it is utilized as a power amplifier (post-amplifier) for compensating for branch loss. Furthermore, viewing the performance of the optical amplifying apparatus, other than the above-described purposes for use in an optical communication network, there has been increased specialization in performance such as use for land-based systems, use for transoceanic systems, and use for wavelength division multiplex (WDM) transmission.

In the future, the focus of development will inevitably shift to the improvement of performance, that is, realization of more sophisticated performance of the optical amplifying apparatus. Realization of such more sophisticated performance will inevitably and naturally require the introduction of computerized control circuits.

The present invention relates to an optical amplifying apparatus into which such computer control has been introduced.

2. Description of the Related Art

Introduction of a computerized optical amplifying control unit enables the performance of the optical amplifying apparatus to be greatly enhanced.

However, a computer-controlled optical amplifying apparatus is subject to new factors of instability which do not occur with conventional optical amplifying control units designed using non-computerized or analog circuits. There are three typical cases of such factors of instability as will be explained in detail below referring to the drawings.

Occurrence of any of the three cases must be of course predicted in computer control. For this reason, it is required to provide the optical amplifying control unit with a failsafe function so as to enable it to cope with any of the above cases which occurs.

However, where such a fail-safe function is provided, there is the problem that the level of the optical output from the optical amplifying apparatus greatly varies or instantaneous disconnection is produced in that optical output. If such a variation or instantaneous disconnection occurs, the main optical signal constituting the important part of the above-described optical output will be instantaneously lost. If such a loss of the main optical signal occurs at the trunk line of the optical communication network, there is a problem in that there might be serious social consequences to the users.

SUMMARY OF THE INVENTION

Accordingly, in consideration with the above-described problems, an object of the present invention is to provide an optical amplifying apparatus which can provide a fail-safe function with respect to abnormalities occurring inside the computer without an accompanying loss of the main optical signal.

To attain the above object, the optical amplifying apparatus according to the present invention comprises an optical amplifying unit including an optical amplifying medium and an optical amplifying control unit controlling the optical amplifying unit under computer control. Here, the optical amplifying control unit is constituted by a status monitoring means for monitoring the current status; an optical output control means for controlling the optical amplifying unit in accordance with the result of the monitoring of the current status; and a status restoring means which initializes the control status of the optical output control means by initializing the computer when detecting an occurrence of an abnormal status by the result of monitoring of the status and restores the optical output control means to the control status before the occurrence of the related abnormal status within a relaxation time inherent in the optical amplifying medium which occurs along with this initialization. By this, the loss of the main optical signal derived from an abnormality such as runaway operation of the computer can be prevented.

BRIEF DESCRIPTION OF THE DRAWINGS

The above object and features of the present invention will be more apparent from the following description of the preferred embodiments with reference to the accompanying drawings, wherein.

DESCRIPTION OF THE PREFERRED EMBODIMENTS

Before describing the embodiments of the present invention, the related art and the disadvantages therein will be described with reference to the related figures.

Figure 9:
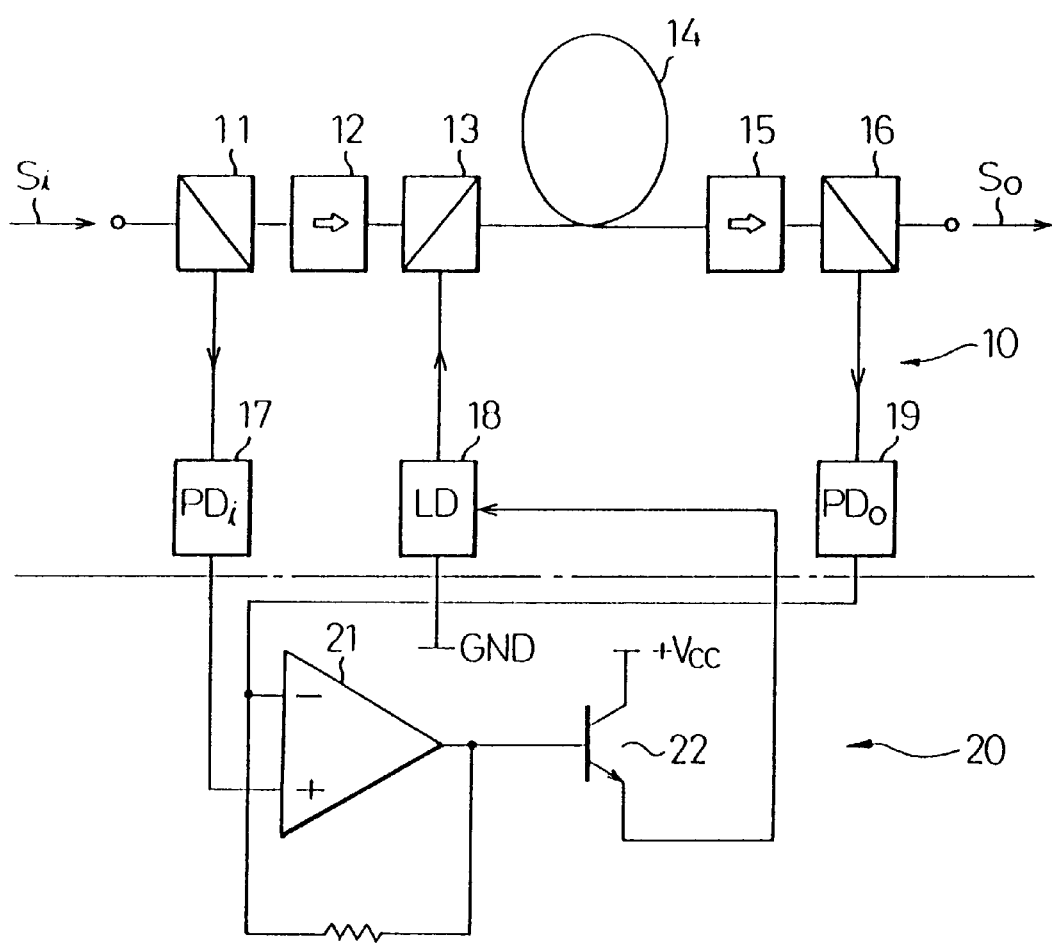
FIG. 9 is a view showing an example of the configuration of a conventional general optical amplifying apparatus.

FIG. 9 is a view showing an example of the configuration of a general optical amplifying apparatus, that is, an example of the configuration of an optical amplifying apparatus realized by analog circuits. This optical amplifying apparatus is constituted by (i) an optical amplifying unit 10 which includes an optical amplifying medium 14 and amplifies an input optical signal $S_i$ and outputs ($S_o$) the same and (ii) an optical amplifying control unit 20 controlling (automatic gain control etc.) the amplification of the optical signal in the optical amplifying unit 10.

Note that, in the present figure, as the optical amplifying medium 14, a rare earth element-doped fiber (for example an erbium-doped fiber) was exemplified, but other than this, a semiconductor etc. can be used too (this is true for the explanation of the present invention as will be mentioned later).

In the optical amplifying unit 10, the input optical signal $S_i$ passes through a light splitting coupler 11, an optical isolator 12, and an optical multiplexer (WDM) 13, reaches the optical amplifying medium 14 comprising an erbium-doped fiber, and further passes through an optical isolator 15 and an optical splitting coupler 16 and is output as the amplified optical signal $S_o$.

This optical amplifying unit 10 includes the above-described erbium-doped fiber (14) and has a laser diode (LD) 18 supplying a pumping energy for exciting the energy level of erbium ions in the erbium-doped fiber. It is the optical amplifying control unit 20 that controls this laser diode 18. Namely, this optical amplifying control unit 20 controls the drive current of the laser diode 18 by receiving as the control inputs the outputs of an input side photodiode ($PD_i$) 17 and an output side photodiode ($PD_o$) 19 which detect part of the optical levels of the aforesaid optical input signal $S_i$ and optical output signal $S_o$, respectively.

This optical amplifying control unit 20 concretely is provided with a comparator 21 and a laser diode (LD) driver 22 as illustrated.

Figure 10:
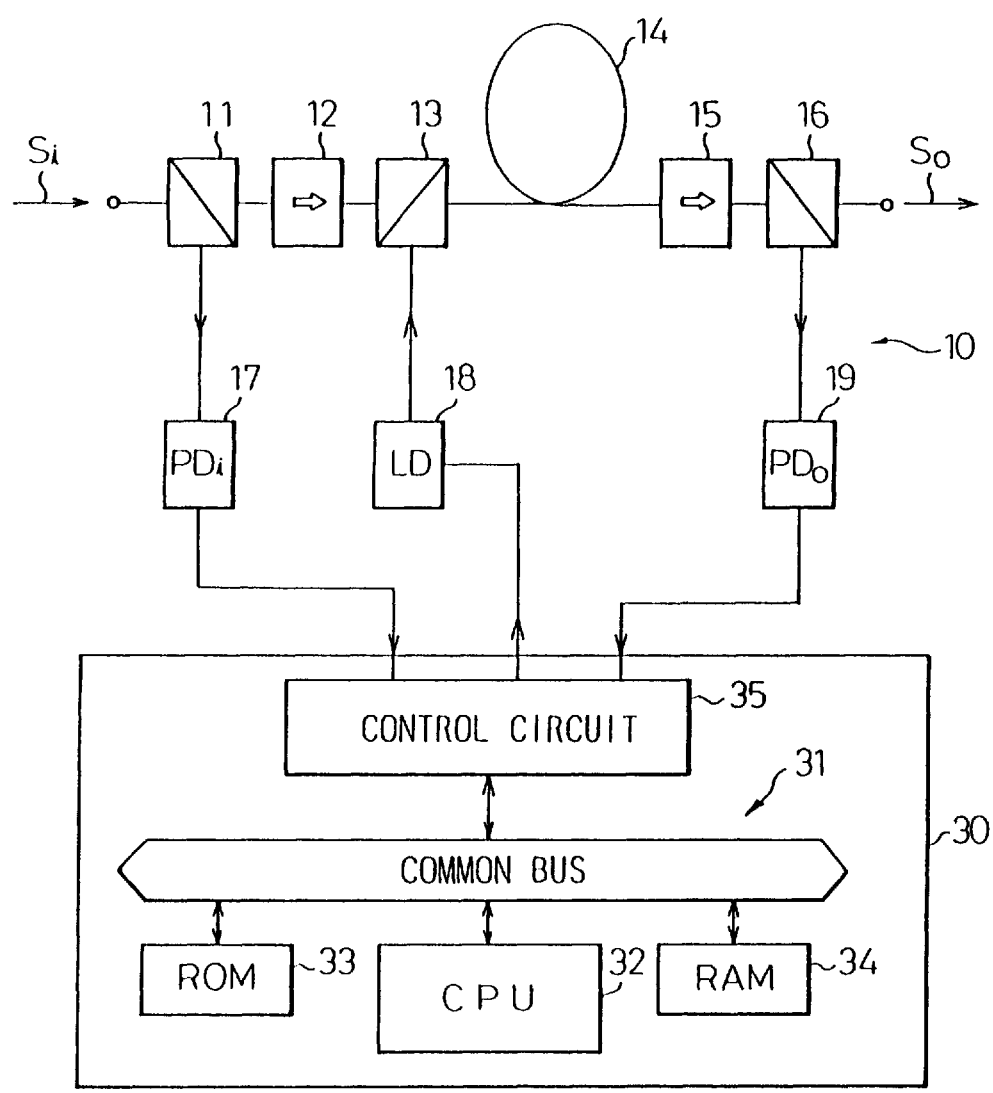
FIG. 10 is a view showing an example of the configuration of the optical amplifying apparatus showing the prerequisite of the present invention.

FIG. 10 is a view showing an example of the configuration of the optical amplifying apparatus serving as prerequisite of the present invention. Note that, as the optical amplifying unit 10, an example adopting quite the same configuration as that shown in FIG. 9 is shown.

The part which should be most noted in the present figure is an optical amplifying control unit 30. This optical amplifying control unit 30 is fundamentally different from the aforementioned analog optical amplifying control unit 20 shown in FIG. 9 in that the control is performed by a computer 31.

The computer 31 is constituted mainly by a central processing unit (CPU) 32, a read only memory (ROM) 33, and a random access memory (RAM) 34 as is well known. This computer 31 controls the optical amplifying unit 10 via a control circuit 35.

As mentioned at first, introduction of the computerized optical amplifying control unit 30 enables the performance of the optical amplifying apparatus to be greatly enhanced. On the other hand, however, a computer-controlled optical amplifying apparatus suffers from the aforementioned new factors of instability which do not arise with the optical amplifying control unit 20 operating using conventional analog circuits (FIG. 9). The typical factors causing instability are as follows:

(i) The CPU 32 sometimes runs out of control. If this runaway operation occurs, there is a concern that a completely unpredictable optical output signal $S_o$ might be transmitted from the optical amplifying apparatus.

(ii) In an environment where there are many α-rays, due to the influence of the α-rays, a bit error is sometimes produced in the data inside the RAM 34 meant to be used in the processing of the CPU 32. If such a bit error occurs, the control status inside the control circuit 35 abruptly changes, and there is a concern that a completely unpredictable optical output signal $S_o$ might be transmitted from the optical amplifying apparatus.

(iii) There is a concern that noise will be induced by a surge of power in the electric circuitry etc. and that under the influence of this noise, the control status inside the computer 31 and control circuit 35 will abruptly change and a completely unpredictable optical output signal $S_o$ will be transmitted from the optical amplifying apparatus.

The occurrence of any of the above situations (i) to (iii) must naturally be predicted under computer control as already mentioned. For this reason, it is required to provide the optical amplifying control unit 30 with a failsafe function so as to enable it to cope with any of the above cases which occurs.

However, where such a failsafe function is provided, the initially mentioned problem occurs. In consideration with the above-described problems, the present invention provide an optical amplifying apparatus which can provide a failsafe function with respect to abnormalities occurring inside the computer without an accompanying loss of the main optical signal.

Figure 1:
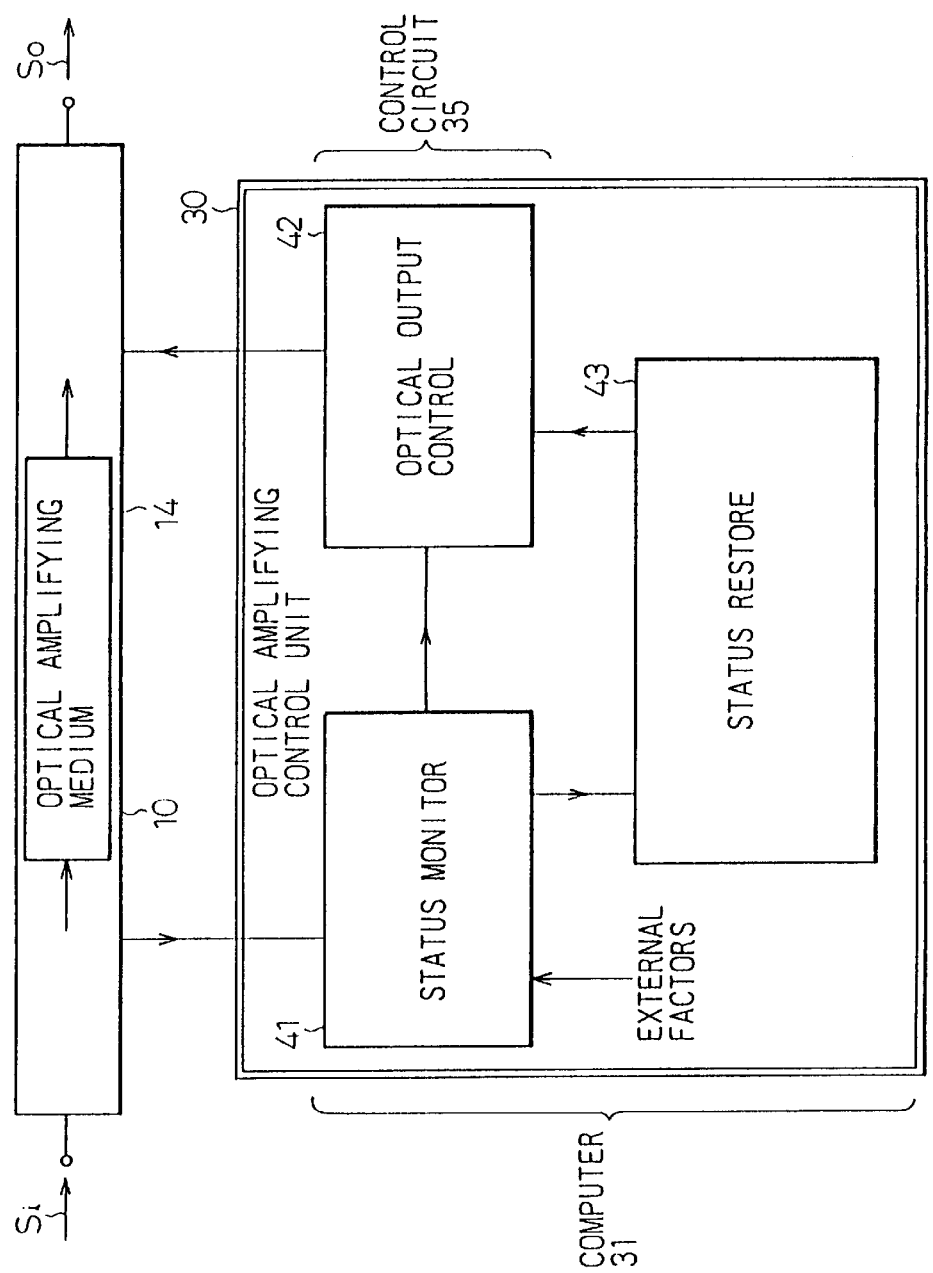
FIG. 1 is a view showing a fundamental configuration of the present invention.

FIG. 1 is a view showing the fundamental configuration of the present invention. As shown in the present figure, the optical amplifying apparatus according to the present invention is an optical amplifying apparatus comprising an optical amplifying unit 10 which includes an optical amplifying medium 14 and amplifies the input optical signal ($S_i$) and outputs ($S_o$) the amplified optical signal and an optical amplifying control unit 30 controlling the amplification of the optical signal in the optical amplifying unit 10 under the control of a computer.

According to a first aspect of the present invention, the optical amplifying control unit 30 comprises a status monitoring means 41, an optical output control means 42, and a status restoring means 43. Note that, these means 41, 42, and 43 are realized by a computer 31 shown in FIG. 10, and particularly the means 41 and 42 are realized by a combination of both of the control circuit 35 and the computer 31 shown in FIG. 10.

i) The status monitoring means 41 monitors the status in the internal portion of the optical amplifying control unit 30 or an external portion thereof.

ii) The optical output control means 42 controls the amplification operation at the optical amplifying unit 10 in accordance with the result of the monitoring of the status by the status monitoring means 41.

iii) The status restoring means 43 initializes the control status of the optical output control means 42 by initializing the computer 31 when an occurrence of ab abnormal status is detected by the result of monitoring of the status by the status monitoring means 41 and restores the optical output control means 42 to the control status before the related abnormal status occurs within a relaxation time inherent in the optical amplifying medium 14 which occurs along with this initialization.

That is, the status monitoring means 41 monitors the status at an internal portion or external portion of the optical amplifying control unit 30. The status in the "internal portion" referred to there means (i) a status of output from the photodiode ($PD_i$, $PD_o$) monitored for performing automatic level control (ALC) etc. inside the optical amplifying unit 10 and (ii) a status of the computer (31) per se which constitutes part of the optical amplifying control unit 30.

On the other hand, the status at the "external portion" means a status at the external portion of the related optical amplifying apparatus, that is, a status of the system surrounding the related optical amplifying apparatus, for example, a status of generation of alarm information from the optical amplifying apparatus connected to the front stage of the related optical amplifying apparatus, alarm information transmitted from an end office of the optical cascaded amplifying and repeating transmission system including the related optical amplifying apparatus, or other alarm information.

The status monitoring means 41 usually (when an abnormal status does not occur) gives the status monitoring result based on the outputs of the photodiodes ($PD_i$, $PD_o$) to the optical output control means 42, where control such as AGC is carried out.

On the other hand, the status monitoring means 41 first starts the status restoring means 43 when detecting an occurrence of an abnormal status.

Figure 2:
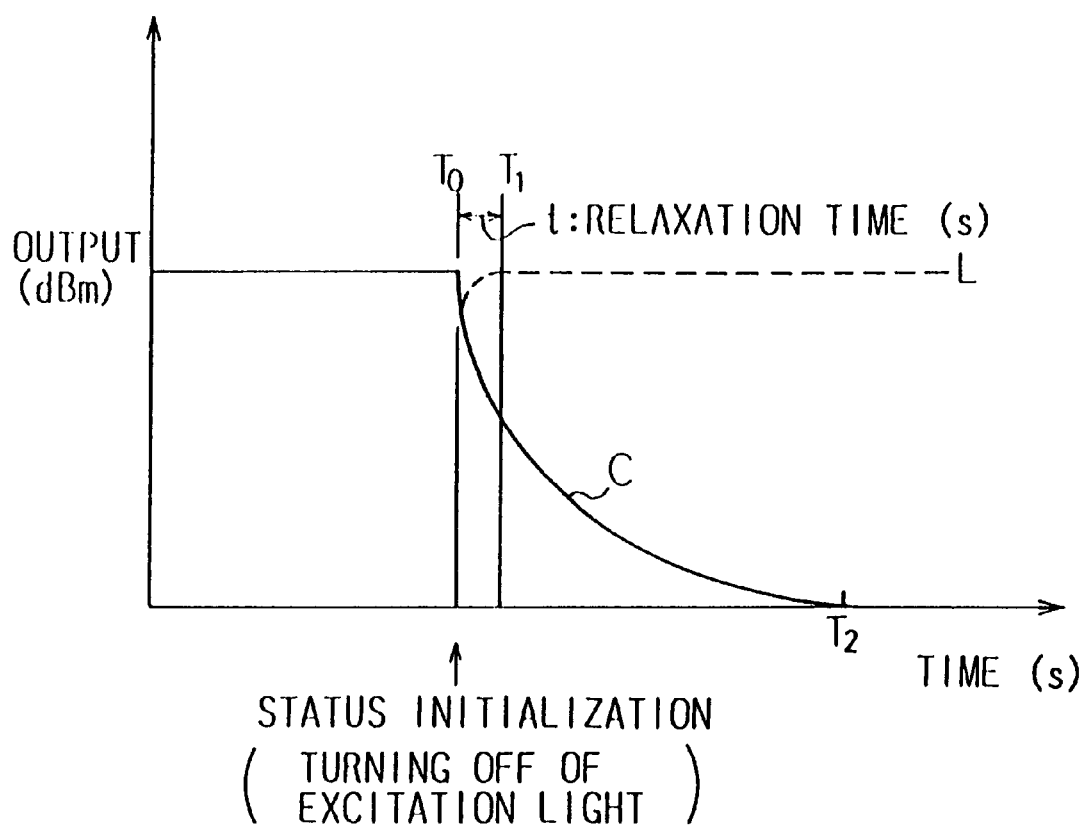
FIG. 2 is a graph for explaining the reason for introducing a status restoring means.

FIG. 2 is a graph for explaining the reason of introducing the status restoring means. The abscissa of the present figure indicates the time (s), and the ordinate indicates the output (dBm) of the optical amplifying medium. It is assumed that the optical amplifying medium 14 has continued the amplification operation normally unit the time $T_0$.

Here, assume that the optical output control means 42 stops the operation at the time $T_0$. Then, at this $T_0$, the optical amplifying medium 14 stops the amplification operation. In this case, the optical output does not suddenly drop to zero, but the optical output is gradually lost along a certain attenuation curve C. The optical output becomes completely zero when the $T_2$ is reached.

Accordingly, after an elapse of the time $T_0$, until the time $T_1$, if the optical output returns to its original level (before time $T_0$), a situation where no instantaneous disconnection of optical output had occurred is maintained when viewed from the output side of the optical amplifying unit 10. This time from the time $T_0$ to $T_1$ is referred to as a "relaxation time" t.

That is, even if the optical output heads toward instantaneous disconnection, if the optical output is restored with the relaxation time t, the optical output signal $S_o$ can be continuously normally transmitted without losing a principal part (main optical signal) of the optical input signal $S_i$ with respect to the optical amplifying apparatus. The length of this relaxation time t differs in accordance with the type of the optical amplifying medium 14. If this medium 14 is for example a semiconductor, t is equal to about 1 μs.

On the other hand, when the optical amplifying medium 14 is a rare earth element-doped fiber, which is becoming the mainstream of such media in recent years, a characteristic is seen where the relaxation time t thereof becomes very long. This relaxation time t corresponds to the time of transition from an excited state to ground state of the energy of the rare earth ions which occurs at an instant when excitation light from the laser diode (LD) 18 is turned off. If the rare earth element-doped fiber used as the optical amplifying medium 14 is for example an erbium-doped fiber, the relaxation time t thereof is equal to about 1 ms.

By taking note of this relaxation time t of about 1 ms, i) when an occurrence of an abnormal status is detected by the result of monitoring of the status by the status monitoring means 41, the status restoring means 43 first initializes the computer 31 so as to initialize the optical output control means 42. By this initialization, the control data inside the optical output control means 42 are all cleared to a logic "0", and accordingly the excitation light from the laser diode driver 22 to the rare earth element-doped fiber 14 is turned off (refer to "status initialization (turning off of excitation light)" at time $T_0$ of FIG. 2).

ii) Subsequent to the above i), the status restoring means 43 restores the optical output control means 42 to the control status before the occurrence of the related abnormal status. This can be realized by causing the computer 31 to start the program after the above initialization. By the start of the program, at least predetermined set point values are loaded again as the control data in the optical output control means 42, and the optical output control means 42 restores to the control status before the time $T_0$ of FIG. 2.

Here, if the restoration to the control status before this time $T_0$ is completed with the above-described relaxation time t, no instantaneous disconnection of the optical main signal appears in the optical output signal $S_o$ from the optical amplifying unit 10. That is, even if the computer 31 is initialized, the main optical signal is continuously output without instantaneous disconnection. On the other hand, the computer 31 which entered into the abnormal status after $T_0$ returns to the normal status by that initialization and restarts the normal operation.

According to a second aspect of the invention, the status restoring means 43 i) makes the optical output control means 42 exercise control so as to affix the optical output from the optical amplifying unit 10 immediately before initializing the control status of the optical output control means 42 by initializing the computer 31 and ii) makes the optical output control means 42 exercise control so as to release the optical output immediately after restoring the optical output control means 42 to the control status before an occurrence of the abnormal status.

That is, in the first aspect of the invention, the initialization of the computer 31 can be executed without accompanying instantaneous disconnection of the main optical signal in the optical output ($S_o$). However, in this second aspect, so as to more reliably and stably execute the initialization without instantaneous disconnection, the optical output from the optical amplifying unit 10 is affixed (the constant output level is forcibly held) immediately before the initialization.

Then, after that initialization, when the computer 31 restores to the normal status, the fixed state of the optical output is released, thereby to return the status to the original control status. As a result, as well as reliable prevention of instantaneous disconnection of the main optical signal, the initialization of the computer 31 can be achieved.

According to a third aspect of the invention, the status restoring means 43 completes the restoration within a time not longer than 1 ms from the start of the initialization when the optical amplifying medium 14 comprises an erbium-doped fiber.

That is, when a rare earth element-doped fiber is used as the optical amplifying medium 14, the process from the initialization to the restoration to the normal status is completed within a time not longer than 1 ms. This 1 ms corresponds to the relaxation time t where the erbium-doped fiber is used.

According to a fourth aspect of the invention, the status monitoring means 41 is connected to an abnormal status detection port 62 provided in the computer 31 and, at the same time, monitors the abnormal status detection output from a watchdog timer 61 provided at an external portion of the computer 31 via the abnormal status detection port 62 and resets the computer 31 when receiving an abnormal status detection output.

That is, as the status monitoring means 41, a well known watchdog timer (WDT) is used.

According to a fifth aspect of the invention, identical series of dummy data are preliminarily written in the ROM 33 and RAM 34 constituting the computer 31, the status monitoring means 41 reads out the series of dummy data and verifies the coincidence between the two, and resets the computer 31 when detecting a lack of match between the two series of data.

That is, as the status monitoring means 41, a means for writing identical series of dummy data in the ROM 33 and RAM 34 and verifying the coincidence between the two series of dummy data read out from them is adopted.

If there is an error in the data stored in the RAM 34, it becomes a factor inducing a runaway operation of the computer. It has been known that a RAM generally is influenced by $\alpha$-rays and is susceptible to bit inversion of held data. On the other hand, it has been known that, generally a ROM is very little influenced by $\alpha$-rays etc.

Therefore, dummy data of completely no relation with the normal operation is preliminarily written in the ROM 33. At the same time, identical dummy data is preliminarily written also in the RAM 34. When comparing the two series of dummy data, if the two do not coincide, the probability of the data having been influenced by $\alpha$-rays etc. is extremely high, and therefore the computer 31 is initialized as already mentioned.

According to a sixth aspect of the invention, the status monitoring means 41 is constituted by an abnormality detection interrupt routine provided in the computer 31 per se and, when this abnormality detection interrupt routine is started, resets the computer 31.

That is, the status monitoring means 41 is realized by an abnormality detection interrupt routine provided in the computer 31.

Note that, in a commercially available processor, the following factors causing the jump to an abnormality detection interrupt routine:

a) When an inappropriate instruction, that is, an undefined code, is executed inside the computer as an instruction.

b) When the program tries to read the instruction from an address error, that is, an unsuitable address, and when it tries to access the data with an unsuitable address.

c) When trying to perform division by zero, that is, perform a division operation with a divisor of zero.

According to a seventh aspect of the invention, the RAM 34 constituting the computer 31 is constituted by a main-RAM 74 provided for the normal data processing of the computer 31 and a sub-RAM 84 provided for storing copied data comprising a plurality of copies of particular important data stored in this main-RAM 74.

Further, when reading particular important data store din the main-RAM 74, the status monitoring means 41 reads out the plurality of copied data corresponding to this data from the sub-RAM 84, executes majority decision processing, and resets the computer 31 when there are two or more copies of data different from the others.

That is, the status monitoring means 41 has a main-RAM and sub-RAM, and a plurality of copies of data are prepared for the particular important data stored in the main-RAM (for example, reference data to be used for ALC, automatic power control (APC), automatic temperature control (ATC) etc.) and are stored in the sub-RAM.

When reading particular important data from the main-RAM, also a plurality of corresponding data stored in the sub-RAM are simultaneously referred to. A majority decision is executed for the plurality of data. If there are two or more data different from the others, it is judged that an abnormal status has occurred in the computer, and the initialization of the computer is executed. This is carried out in consideration of the fact that generally a RAM is easily influenced by $\alpha$-rays or the like and bit inversion occurs in the held data.

If there is only one set of data different from the others, it is not thought that this represents a serious abnormal status, but if there are two or more sets of such different data, this represents a series abnormal status, and thus the initialization (i.e., reset) of the computer is carried out.

According to an eight aspect of the invention, the optical amplifying control unit 30 is constituted by i) a status monitoring means 41 for monitoring the status in the internal portion of the optical amplifying control unit 30 or external portion thereof; ii) an optical output control means 42 for controlling the amplification at the optical amplifying unit 10 in accordance with the result of monitoring of status by the status monitoring means 41; iii) a status restoring means 43 which repairs the abnormal status when detecting an occurrence of the abnormal status by the result of monitoring of status by the status monitoring means 41; and iv) a main-RAM 74 provided for the normal data processing of the aforesaid computer and a sub-RAM 84 provided for storing copied data comprising a plurality of copies of particular important data stored in the main-RAM 74 and, at the same time, the status monitoring means 41 reads out corresponding plurality of copies of data from the sub-RAM 84 when reading particular important data stored in the main-RAM 74 and executes majority decision processing and the status restoring means 43 is constituted so that, when the status monitoring means 41 judges there is a copy of data different from the others by the above-described majority decision processing, it rewrites this to the related other copies of data.

The eighth aspect of the invention is similar to the seventh aspect of the invention, but does not require the operation for initialization of the computer.

When it is judged that there is one set of data different from the others by the majority decision mentioned in the seventh aspect, since this does not represent a serious abnormal status for the computer, the related one set of erroneous data is repaired by the other remaining majority of sets of data. That is, error correction of the related data is carried out, and the normal optical amplifying operation is continued as it is.

According to a ninth aspect of the invention, under the first aspect, there may be further provided a statistical processing means 91 for cumulatively adding the number of occurrence of the abnormal status and recording the same whenever the occurrence of an abnormal status is detected by the status monitoring means 41.

According to a tenth aspect of the invention, under the eighth aspect, there may be further provided a statistical processing means 91 for cumulatively adding the number of occurrence of the abnormal status and recording the same whenever the occurrence of an abnormal status is detected by the status monitoring means 41.

That is, according to the ninth and tenth aspects, a statistical processing means is introduced and the number of occurrences of an abnormal status as detected by the status monitoring means 41 is recorded along with time.

Based on this recording, the operational state of the related optical amplifying apparatus, particularly the computer 31, can be analyzed with a high precision, and an improvement of reliability can be achieved.

according to an eleventh aspect of the invention, under the first aspect, the statistical processing means 91 is constituted so as to stop the control of the optical amplifying unit 10 by the computer 31 and, at the same time, generate an alarm when the cumulative number of occurrences of an abnormal status reaches a predetermined threshold value.

According to a twelfth aspect of the invention, under the eighth aspect, the statistical processing means 91 is constituted so as to stop the control of the optical amplifying unit 10 by the computer 31 and, at the same time, generate an alarm when the cumulative number of occurrences of an abnormal status reaches a predetermined threshold value.

That is, according to the eleventh and twelfth aspects, when the above-described analysis clarifies that the number of occurrences of the abnormal status has reached a predetermined threshold value, any attempt to continue the operation of the optical amplifying apparatus is abandoned and an alarm is generated. This is because if a restoration operation is unreasonably repeated, it would be liable to induce a serious accident such as a systems failure.

More specific examples of the embodiments will be described next with reference to the drawings.

Figure 3:
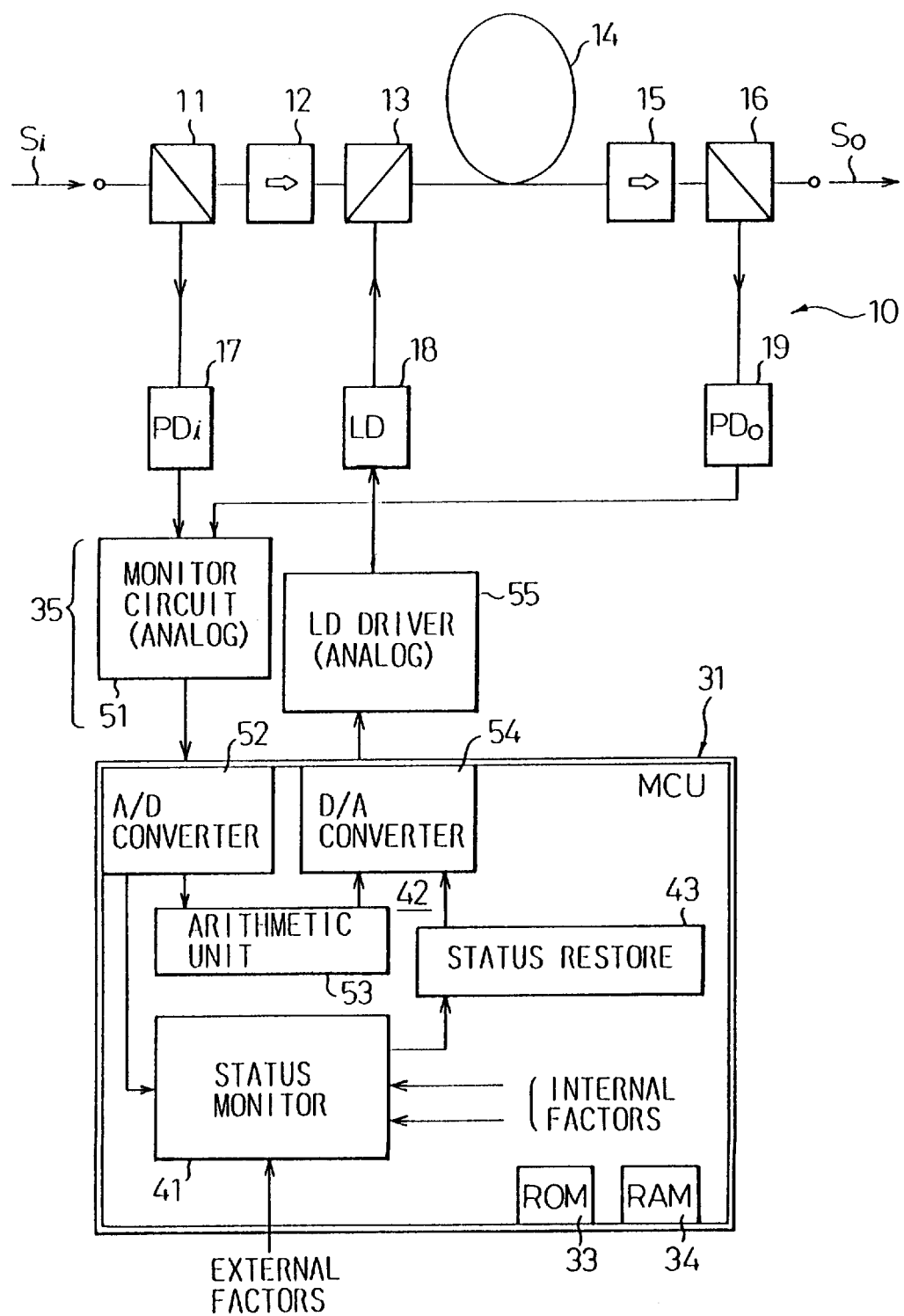
FIG. 3 is a view showing an example of a configuration showing a more concrete form of the fundamental configuration shown in FIG. 1.

FIG. 3 is a view showing an example of the configuration more concretely illustrating the fundamental structure shown in FIG. 1. Note that, as the optical amplifying unit 10, the same configuration as that in FIG. 10 was adopted.

In FIG. 3, portions given the reference numerals 31 and 35 are the computer and control circuit which are indicated also in FIG. 10, respectively. Note that, the computer 31 is constituted by a microcomputer unit (MCU) fabricated as an LSI chip in this example.

In the part of the control circuit 35, an analog monitor circuit 51 and a laser diode driver 55 (corresponding to 22 of FIG. 9) are included.

Parts of the already mentioned status monitoring means 41, status restoring means 43, and the optical output control means 42 are formed inside the computer (MCU) 31. These means are indicated as hardware inside the MCU, but in the examples, they are actually realized by software (program control).

The optical output control means 42 inside the MCU includes an arithmetic operation unit 53 and a D/A converter 54, while the optical output control means 42 outside the MCU includes the aforesaid laser diode driver 55. The arithmetic operation unit 53 fetches the analog output from the above-described monitor circuit 51 as digital data via the A/D converter 52. The result of that digital operation is applied to the laser diode driver 55 via the D/A converter 54.

The arithmetic operation unit 53 is not a particularly significant constituent part of the present invention, but receives as its input a numerical value (digital data) from the A/D converter 52 indicating the output of the monitor circuit 51, takes a differential value between this numerical value and the related reference value (target output level), and controls the laser diode driver 55 by this differential value via the D/A converter 54. Note that, for reference, concrete examples of the monitor circuit 51 and the laser diode driver 55 are shown.

Figure 4:
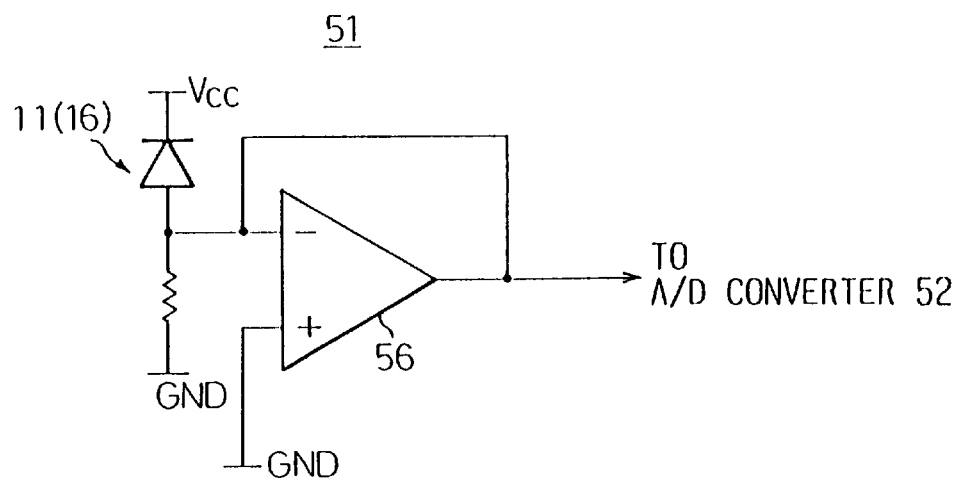
FIG. 4 is a view showing a concrete example of a monitor circuit.
Figure 5:
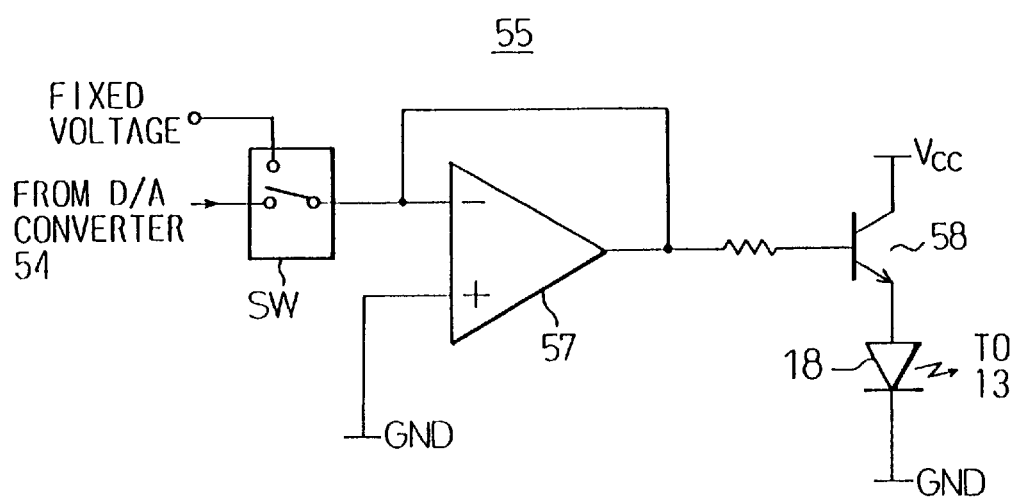
FIG. 5 is a view showing a concrete example of a laser diode driver.

FIG. 4 is a view showing a concrete example of the monitor circuit; and FIG. 5 is a view showing a concrete example of the laser diode driver.

In FIG. 4, reference numeral 56 is an operational amplifier, which receives an optical input signal ($S_i$) level from the photodiode 17 and transmits the output thereof to the A/D converter 52. Note that, a circuit similar to that of FIG. 4 can be provided also on the side receiving the optical output signal ($S_o$) level from the photodiode 19, but it is indicated in FIG. 4 as representative for simplification.

In FIG. 5, reference numeral 57 denotes an operational amplifier, and 58, a driver transistor which drives the already mentioned laser diode 18. Note that the second aspect discussed above disclosed an example wherein the optical output from the optical amplifying unit 10 is fixed before performing the initialization of the computer 31 and is released thereafter. The affixing or releasing of this optical output can be realized by a switch SW shown in FIG. 5. The changeover of the contact point in this switch SW is carried out by the status restoring means 43 through the optical output control means 42.

Figure 6:
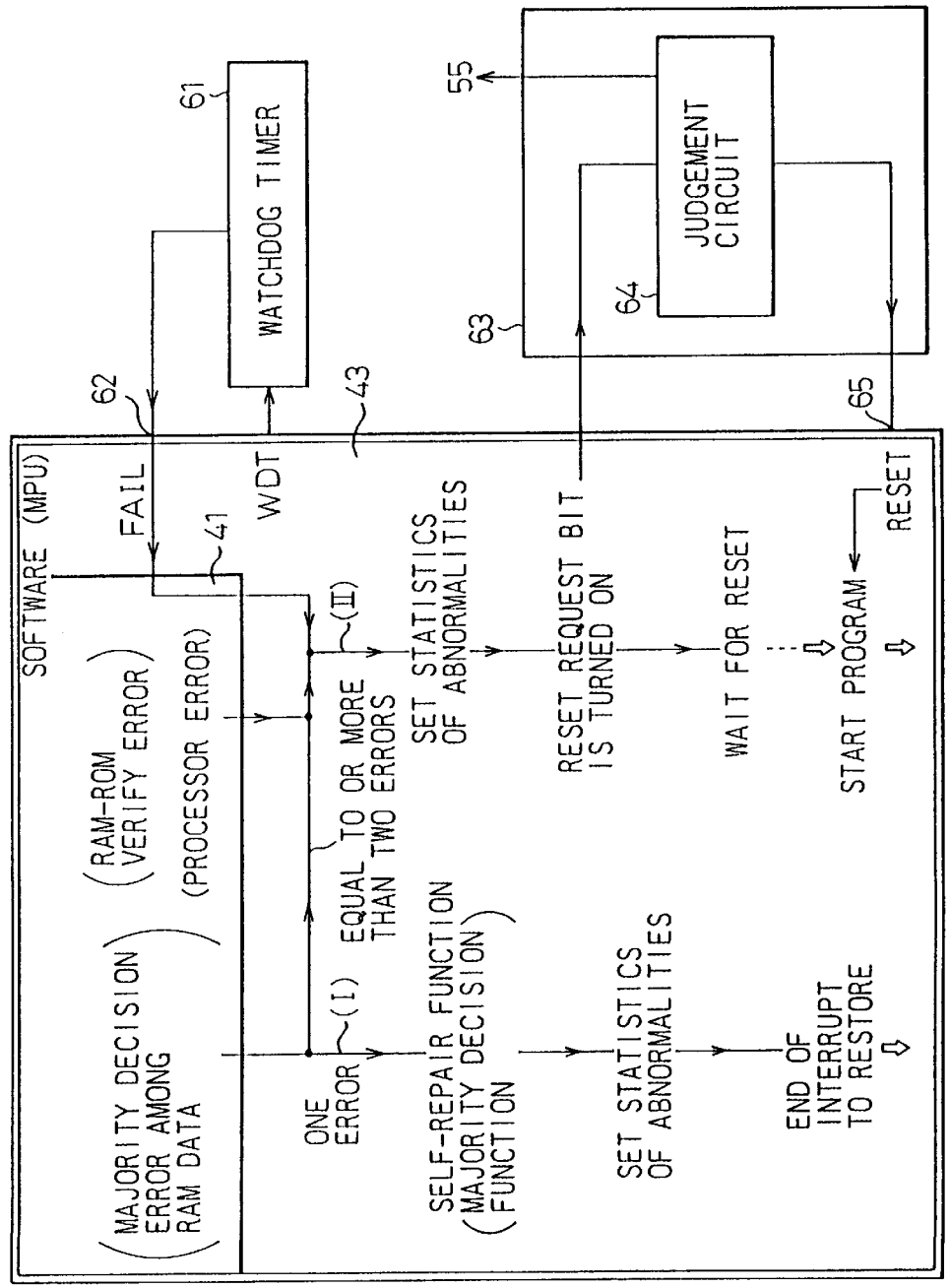
FIG. 6 is a flowchart diagrammatically showing software mainly constituting the status monitoring means and the status restoring means in FIG. 3.

FIG. 6 is a flowchart diagrammatically showing the software constituting mainly the status monitoring means 41 and the status restoring means 43 in FIG. 3. The part of 41 in the flowchart of the present figure corresponds to the status monitoring means, and the part of 43 corresponds to the status restoring means.

Status Monitoring Means 41

(i) Corresponding to the fourth aspect explained above, an error detected by the watchdog timer 61 enters into the abnormal status detection (FAIL) port 62, and an abnormal interrupt mode is commenced.

(ii) Corresponding to the fifth aspect explained above, series of dummy data the same as each other preliminarily written in the ROM 33 and RAM 34 are simultaneously read out and the coincidence between the two is verified. When a lack of match is detected between the two series of dummy data by this verification, it is judged that an error has occurred. This is described as "RAM-ROM verify error" in FIG. 6. The abnormal interrupt mode is then commenced.

(iii) Corresponding to the sixth aspect explained above, the abnormal detection interruption routine provided in the computer per se is utilized. When a computer abnormality is detected by this routine, it is judged that a processor error has occurred. This is described as "processor error" in FIG. 6. The abnormal interrupt mode is then commenced.

(iv) Corresponding to the seventh aspect explained above, a plurality of copies of data stored in the sub-RAM and the data stored in the main-RAM are read out and a majority decision is taken. When not all of the data coincide (if there is data different from the others even if only one), this means that an error has occurred in the majority decision among the RAM data. This is described as a "majority decision error among RAM data" in FIG. 6, and the abnormal interrupt routine is then commenced.

Note that, the content of the abnormal interrupt routine differs depending upon whether the content of majority decision error among the RAM data is "one error" or "two or more errors". That is, as shown in FIG. 6, if it is "one error", the routine (I) is performed in the status restoring means 43, and if it is "two errors", the routine (II) is performed therein, respectively.

Status Restoring Means 43

The above-described routine (I) (FIG. 6) corresponds to the eighth aspect of the invention. The operation such as initialization of the computer is not required and the related error is restored by the self-repair. This is the "self-repair function" in the figure. That is, if only one among the plurality of data is different data, that error data is replaced by the remaining large number of identical data.

Statistical processing of the abnormalities is carried out for the above-described data error ("set statistics of abnormalities" in the figure). This corresponds to the tenth aspect explained above. On the other hand, even in the routine (II) of FIG. 6, as illustrated, a similar "set statistics of abnormalities" is carried out. This corresponds to the ninth aspect explained above.

Returning to the routine (I) again, after the "set statistics of abnormalities" is carried out, the interrupt for the related self-repair is ended, and the original normal status is restored without resetting the computer.

Note that, the above-mentioned majority decision among the RAM data is executed preceding the read out of data of the main-RAM when reading the data thereof.

Next, an explanation will be made of the routine (II) of FIG. 6. As mentioned before, this routine (II) is performed when two or more errors are found to occur by the majority decision among the RAM data, when a processor error occurs, when a RAM-ROM verity error occurs, or when an abnormal status detection (FAIL) by the watchdog timer 61 occurs.

When any error described above occurs, the aforementioned statistical processing of abnormalities is carried out at first. The statistical processing of abnormalities is carried out at this stage because, if another error occurs after for example the program starts thereafter, the occurrence of the preceding error is ignored and it becomes impossible to obtain correct statistics. Note that this statistical processing of abnormalities is completed in an extremely short time in comparison with the already mentioned relaxation time t.

The routine (II) proceeds and an illustrated "reset request bit is turned on". By the turning on of this reset request bit, the operational routine goes outside of the MCU (computer 31) and moves into the peripheral circuit 63. Particularly at the judgement circuit 64 in this peripheral circuit 63, a judgement on the related request for reset is carried out. This judgement circuit 64 is fabricated by a general LOGIC IC. In this judgement, when a judgement for affixing the output light is carried out, a corresponding command is issued to the switch SW (FIG. 5) of the laser diode driver 55.

The judgement circuit 64 issues a reset command to the reset input terminal 65 of the MCU when judging that the reset request bit mentioned before is one of the above-described various errors from the monitoring means 41 (processor error, RAM-ROM verify error).

Here, the MCU is reset, and the MCU starts the program again. By the start of this program, the content of the above-mentioned RAM 34 or main-RAM and sub-RAM is reset, and the data is reloaded by the ROM 33. Here, the MCU restores its original normal operational status.

Figure 7:
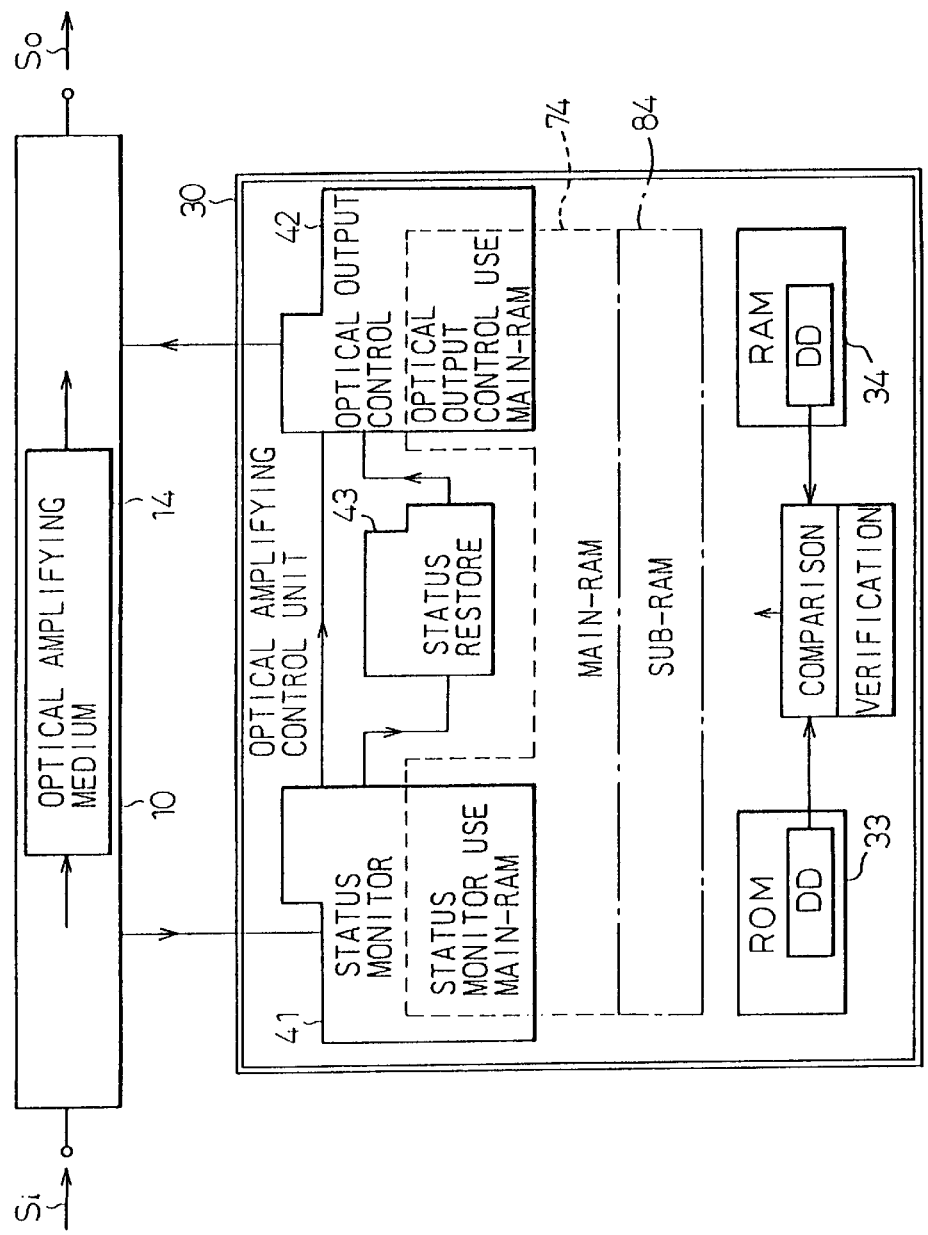
FIG. 7 is a view diagrammatically showing an example of the configuration of a main-RAM and a sub-RAM.

FIG. 7 is a view diagrammatically showing an example of the configuration of the main-RAM and the sub-RAM. In the present figure, reference numerals 74 and 84 are the already mentioned main-RAM and sub-RAM, respectively. The main-RAM 74 may further include a main-RAM for monitoring the status illustrated, a main-RAM for the output control, and a main-RAM for general purpose (general matter concerning the related optical amplifying apparatus). It is also possible to constitute these main-RAMs by one part of the region in the RAM 34 or constitute the same by RAMs different from the RAM 34 as in the present figure.

Among the data stored in the main-RAM 74, a plurality of copies of data are made for each of the particular important data. These copies of data are stored in the sub-RAM 84.

FIG. 7 illustrates the fifth aspect explained above in further detail. The dummy data in this aspect is indicated as DD in the same figure and is preliminarily stored in the ROM 33 and RAM 34. For example, when the significant data is read out from the RAM 34 (or main-RAM 74), the dummy data DD in the ROM 33 and the dummy data DD in the RAM 34 are read out first and the two are compared to verify that they coincide.

Figure 8:
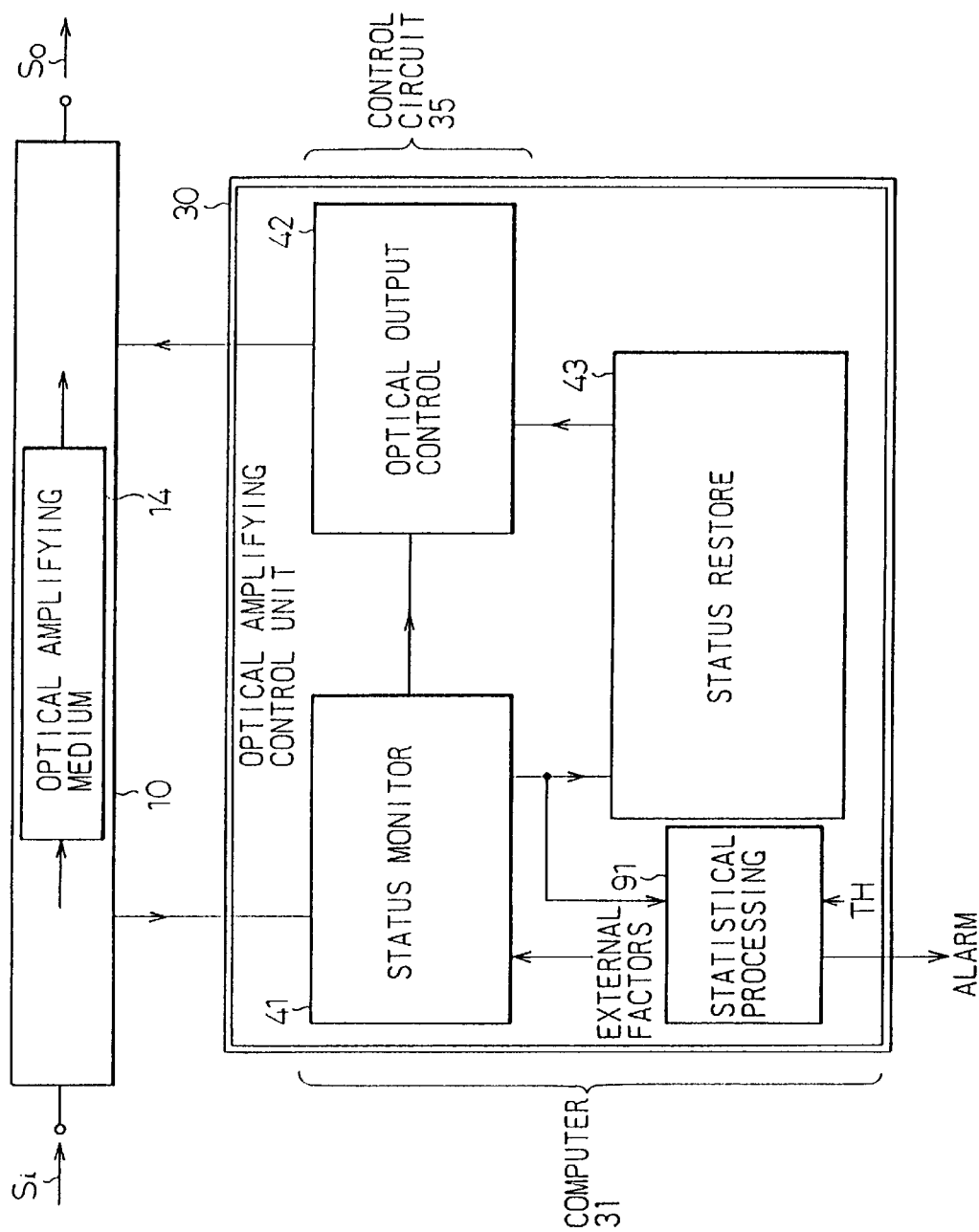
FIG. 8 is a view showing an example of a statistical processing means.

FIG. 8 is a view showing an example of a statistical processing means. This statistical processing means is indicated by reference numeral 91 in the present figure and used in the ninth to twelfth aspects of the invention previously explained. Also, TH in the same figure is the already mentioned threshold value. When the number of occurrences of abnormal status reaches the predetermined threshold value TH, the control of the optical amplifying unit 10 is stopped and, at the same time, an alarm is generated.

Finally, a concrete example of the normal operation of the MCU and the abnormal operation under software processing shown in FIG. 6 will be explained.

1. Case of detection of abnormality by watchdog timer

At the time of a normal operation, a rectangular wave signal of a certain period is output from the WDT port (WDT) of the MPU.

The output of the watchdog timer 61 is fixed to "L" during the period where the rectangular wave signal is input from the port (WDT).

At the time of an abnormal operation, the period of the rectangular wave signal from the port (WDT) of the MPU becomes unstable.

If the input to the watchdog timer 61 does not vary for a certain term or more, the output of 61 becomes "H".

Accordingly, the port (FAIL) 62 becomes "H", and the routine of the abnormal interrupt mode shown in FIG. 6 is commenced.

2. Case of detection of abnormality by RAM-ROM verify

At the time of a normal operation, where a routine with a high significance that is related to the data operation in the RAM (34, 74) such as rewriting of data during a program is executed, a comparison is made of the two series of both dummy data (DD) in the RAM 34 and ROM 33 to examine whether or not the data in the RAM (34, 74) which is easily rewritten when influenced by the external environment such as by α-rays is normal.

When it is normal, it is confirmed that the series of dummy data DD in the RAM and ROM are identical and the normal processing is entered.

At the time of an abnormal operation, an abnormality is where a difference is discovered between the series of dummy data DD in the RAM (34, 74) and ROM 33. In this case, the routine of the abnormal interrupt mode is immediately commenced.

3. Case of processor error detection

At the time of normal operation, the system operates normally with no particular problem.

At the time of abnormal operation, problems may occur due to any of the following already mentioned causes. These are usually followed by abnormal interrupt processing in a commercially available MPU.

i) Unjust instruction: This occurs when an attempt is made to execute undefined codes as an instruction.

ii) Address error: This occurs when the program tries to read an instruction from an unsuitable address or to access such an unsuitable address.

iii) Division by zero: This occurs when an attempt is made to perform a division operation by a divisor of zero.

When an abnormality due to any of the above causes occurs, the routine of the abnormal interrupt mode is immediately commenced.

4. Majority decision processing among RAM data

At the time of a normal operation, a plurality of copies of data in the RAM (34, 74) which are significant in the program are store din the sub-RAM 84. When accessing the data, the corresponding plurality of copies of the data are compared with each other, and the coincidence is confirmed. Thereafter, that RAM data is accessed.

At the time of an abnormal operation, all data including the aforementioned copies of data are compared. Where only one set is different, the other sets of data are given priority and that different one set of data is revised. Thereafter, the RAM data is referred to.

When the aforementioned corresponding copies of data are compared with each other and there are two or more sets of different data, the routine of the abnormal interrupt mode of FIG. 6 is commenced.

As mentioned above, the effects of the first to twelfth aspects of the present invention are as follows:

According to the first aspect, an abnormality occurring inside the computer 31 can be cleared without instantaneous disconnection of the main optical signal and the optical amplifying apparatus can be returned to the original normal operation status.

According to the second aspect, by affixing the optical output, the instantaneous disconnection of the optical main signal can be further reliably and stably prevented.

According to third aspect, if a rare earth element-doped fiber is used, it is sufficient to initialize the computer and restore the original control status within a time not longer than 1 ms.

According to the fourth aspect, the status monitoring means 41 can be realized by an extremely general watchdog timer.

According to the fifth aspect, it is useful in a case where the optical amplifying apparatus is placed under an environment where the RAM data easily inverts in bits due to α-rays etc.

According to the sixth aspect, the status monitoring means 41 can be realized by diverting the abnormal detection interrupt routine generally provided in the usual MCU.

According to the seventh aspect, for the significant data in RAM, a plurality of copies of data are store din a similar RAM and coincidence among the respective data is decided by a majority decision. This is useful in a case where the optical amplifying apparatus is placed under an environment where the RAM data easily inverts in bits due to α-rays etc.

According to the eighth aspect, if there is only one set of erroneous data in the above seventh aspect, the MCU does not have to be initialized. It is sufficient so far as the related erroneous data is repaired by the content of the other large number of data.

According to the ninth and tenth aspects, the occurrence condition of abnormalities of the computer 31 can be analyzed, and the reliability improved.

According to the eleventh and twelfth aspects, when it is clarified that abnormality exceeding an allowable limit have occurred as a result of analysis of the state of occurrence of abnormalities of the computer 31, the operation of the related optical amplifying apparatus is stopped and, at the same time, an alarm is issued, thereby preventing systems failure to repeated attempts at restoration.

What is claimed is:

1. An optical amplifying apparatus comprising:
   an optical amplifier for amplifying an input light to said apparatus, which optical amplifier has a rare earth element-doped fiber and an optical isolator;
   an input light monitor for monitoring said input light;
   an output light monitor for monitoring an output light from said apparatus;
   a pumping energy supplier for generating a pumping energy;
   a control circuit; and
   a computerized processor means, said control circuit being connected to said input light monitor, said pumping energy supplier, said output light monitor and said computerized processor means, and converting an analog signal of said input light monitor and an analog signal of said output light monitor into digital data for providing said digital data to said computerized processor means and also converting digital data from said computerized processor means into an analog signal for providing said analog signal to said pumping energy supplier; wherein
   said computerized processor means conducts digital processings, via said control circuit, to control said pumping energy in accordance with a status of at least one of said input light monitor and said output light monitor.

2. An optical amplifying apparatus as set forth in claim 1, wherein said control circuit is operative to convert analog signals output from said input light monitor (17) and said output light monitor (19) to digital signals.

3. An optical amplifying apparatus as set forth in claim 1, wherein said control circuit (35) is operative to convert digital signals output from said processing means (31) to analog signals.

4. An optical amplifying apparatus as set forth in claim 1, wherein said processor means has a central processing unit (CPU) to perform an arithmetic operation.

5. An optical amplifying apparatus as set forth in claim 1, wherein said processor means includes a CPU.

6. An optical amplifying apparatus as set forth in claim 1, wherein said processor means includes a micro computer unit.

7. A method of controlling an optical amplifying apparatus driven by a pumping energy, the method comprising the steps of:
   (a) monitoring one of an analog input signal to said optical amplifying apparatus and an analog output signal therefrom;
   (b) converting said monitored analog signal to a digital signal; and
   (c) performing an arithmetic operation on said digital signal input and controlling said pumping energy according to a result of the arithmetic operation.

8. An optical amplifying apparatus controlled by a computer, comprising:
   an optical amplifier for amplifying an input light to said apparatus, which optical amplifier has a rare earth element-doped fiber and an optical isolator;
   an input light monitor for monitoring said input light;
   an output light monitor for monitoring an output light from said apparatus;
   a pumping energy supplier for generating a pumping energy;

a control circuit; and a computerized processor means, said control circuit being connected to said input light monitor, said pumping energy supplier, said output light monitor and said computerized processor means, and converging an analog signal of said input light monitor and an analog signal of said output light monitor into digital data for providing said digital data to said computerized processor means and also converting digital data from said computerized processor means into an analog signal for providing said analog signal to said pumping energy supplier; wherein said computerized processor means includes a programmed computer and conducts digital processings and is operative, via said control circuit, to control said pumping energy in accordance with a status of at least one of said input light monitor and said output light monitor.

* * * * *